(No Model.)

E. WEGMANN, Jr.
MUTE FOR STRING INSTRUMENTS.

No. 551,067.  Patented Dec. 10, 1895.

WITNESSES:
H. Ebut Vandyke
N. C. Calhoun

INVENTOR
Edward Wegmann Jr.
BY
Barker, Bolston & Legendre
ATTORNEYS

UNITED STATES PATENT OFFICE.

EDWARD WEGMANN, JR., OF ENGLEWOOD, NEW JERSEY.

MUTE FOR STRING-INSTRUMENTS.

SPECIFICATION forming part of Letters Patent No. 551,067, dated December 10, 1895.

Application filed November 3, 1894. Serial No. 527,846. (No model.)

*To all whom it may concern:*

Be it known that I, EDWARD WEGMANN, Jr., a citizen of the United States, residing at Englewood, in the county of Bergen and State of New Jersey, have invented certain new and useful Improvements in Mutes for String-Instruments, of which the following is a full, clear, and exact specification.

The objects of my invention are, first, to so construct a mute for a violin or other string-instrument that it shall be located beneath the strings thereof; second, to attach the said mute to the bridge of such instrument; third, to make the same of such construction and provide a means to so apply the same to an instrument that the effect produced, when the instrument is played upon, will be simply a muffled sound free from harshness; fourth, to make the said mute in such a manner that it may be readily attached or detached from the bridge or the pressure of the said mute-instrument against the bridge altered, and thus the loudness of the instrument altered at will.

With this object in view reference is had to the annexed specification and drawings, in which—

Figure 1:
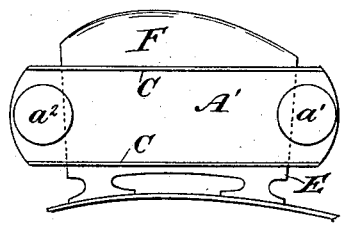
Figure 2:
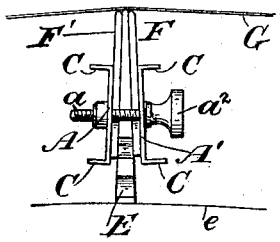
Figure 3:
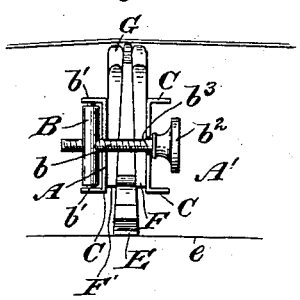
Figure 4:
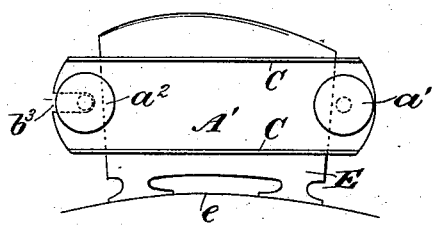
Figure 5:
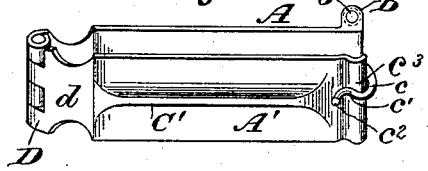
Figure 6:
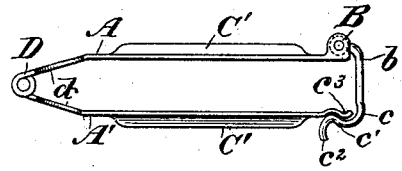
Figure 7:
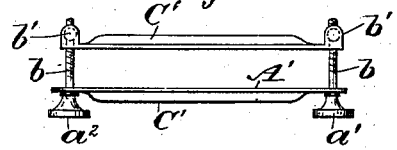

Figure 1 is a side elevational view of the said mute clamped to a violin-bridge. Fig. 2 is an end view in elevation of Fig. 1. Fig. 3 is also an end view in elevation showing a form of catch or clamp. Fig. 4 is a front elevational view of Fig. 3. Fig. 5 is a perspective view of a modified form of clamp-catch and spring. Fig. 6 is a top view of Fig. 5. Fig. 7 is a top view of the preferred form of clamp-mute.

A A' represent the sides of a mute consisting, essentially, of a clamp formed of two principal pieces, one of the said pieces, A, having a threaded hole near one end and the other of the said pieces, A', having a plain hole near one of its ends to register with the threaded hole of the said first-named plate A. Passing loosely through the said plain hole in the plate A' is a screw $a$, which is provided, preferably, with a milled head $a^2$ and passes into the threaded hole of the said plate A. As shown in Fig. 1, a screw $a'$ similar to the screw $a$ may be similarly employed to connect the said pieces A A' adjustably together at that end.

The preferred form or principle of construction, however, is set forth in Fig. 7 and in the catch of Fig. 3, which latter consists of a bar B, pivoted in a manner, as at $b'$ $b'$, to one plate and having a screw $b$, adapted to swing into a slot $b^3$, formed to receive it, in the opposite plate, and having an adjustable milled head or nut $b^2$ to clamp the two plates A A' together.

Instead of a screw $b$ a plain spring-rod may be used, bent, as in Fig. 5, at $c$ to form a catch-shoulder, as at $c'$, and a projection, as at $c^2$, the said shoulder $c'$ engaging or catching on the plate A' by means of springing frictionally over a raised portion $c^3$ of the said plate. Brace or strain edges C C may be formed along one or both of the said plates and serve to stiffen the same when clamped together, or a single corrugation C' or a double one may be formed longitudinally along one or both of the said plates A A' instead of the turned edges C C. A hinge D and spring portions $d$ of the said plates represent a modified form of construction instead of the screw $a$ or $a'$ for fastening the opposite ends of the plates A A' movably together.

The preferred construction, as set forth in Fig. 7, consists, essentially, of the clamp-plates A A', having the corrugated braces C' C', and a swiveled clamp device, preferably a swiveled screw, as set forth in Fig. 3, one of the clamp screws or stems $b$, as at the head $a'$, simply passing through an elongated hole in one of the said plates from the other of the said plates, the said elongated hole serving, with the said screw or stem, the purpose of the hinge D. The advantage of this construction is that the clamp-plates of the mute may be adjusted at each end to correspond to any unevenness in the bridge or felt and the said clamps may be easily removed.

E represents a violin-bridge seated upon the sounding-board $e$ of the instrument. On each side of the said bridge is placed a piece of thick flat or beveled felt F F'. (See Figs. 2 and 3.) These pieces of felt are clamped in place against the said bridge E by means of either of the clamp devices already set forth.

G represents a violin-string stretched across the bridge.

The principle of operation as embodied in this invention is that if a piece or pieces of soft material (not necessarily felt, but preferably so) be clamped against the bridge of a violin or similar instrument the vibrations of the said bridge are thereby lessened. This condition greatly reduces the strength of sound of a note or notes produced by the strings when the felt is thus clamped against the said bridge.

I prefer to taper the felt, as set forth in Fig. 3, as the clamp device holds the said felt in a better manner against the said bridge on account of the beveled form of the latter.

What I claim, and desire to secure Letters Patent on, is—

A bridge for a stringed instrument, combined with a mute, consisting of two plates, two strips of soft material placed between the bridge and plates, and clamping means applied to the plates, whereby the pressure upon the bridge can be regulated at will; the plates being attached to the bridge below the strings, substantially as shown.

In testimony that I claim the foregoing I have hereunto set my hand this 22d day of October, 1894.

E. WEGMANN, Jr.

Witnesses:
JACOB D. GOODHART,
JOHN F. BARTELS.